(12) United States Patent
Barchi

(10) Patent No.: US 6,507,866 B1
(45) Date of Patent: Jan. 14, 2003

(54) E-MAIL USAGE PATTERN DETECTION

(75) Inventor: Ronald S. Barchi, Maple Valley, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/356,974

(22) Filed: Jul. 19, 1999

(51) Int. Cl.[7] ............................................. G06F 15/16
(52) U.S. Cl. ..................... 709/207; 709/225; 709/232; 712/300
(58) Field of Search ............................... 709/223–226, 709/232, 207; 712/300, 310

(56) References Cited

U.S. PATENT DOCUMENTS 5,948,058 A * 9/1999 Kudoh et al. ............... 709/206
6,052,709 A * 4/2000 Paul ............................ 709/202
6,072,942 A * 6/2000 Stockwell et al. ...... 395/200.36
6,092,103 A * 7/2000 Prtisch

OTHER PUBLICATIONS

Miyake et al., "Information Filtering Using Fuzzy Models", IEEE, pp. 32–37, 1997.*

* cited by examiner

*Primary Examiner*—John A. Follansbee
(74) *Attorney, Agent, or Firm*—Kenyon & Kenyon

(57) ABSTRACT

A method and apparatus for identifying undesired e-mail messages by receiving e-mail messages, storing fields from the headers of the received e-mail messages and analyzing the stored fields for patterns indicative of undesired e-mail messages. The pattern recognition performed includes counting the number of e-mails received which have the same or similar field content within the headers. This number can be compared to an absolute threshold number, or to the total number of messages in a sample of e-mail messages. The sample may be composed of a predetermined number of received e-mail messages, or may include e-mail messages received during a predetermined time interval. Exceeding thresholds or certain ratios will trigger alarms to alert monitoring functions and update lists of known sources and types of undesired e-mail messages for filtering.

8 Claims, 9 Drawing Sheets

E-MAIL USAGE PATTERN DETECTION

BACKGROUND OF THE INVENTION

The present invention relates to methodologies for detecting patterns in received e-mail messages on a computer system. In particular, the present invention describes a method for detecting undesired e-mail usage based on the pattern of received e-mail messages on a computer system.

Detection of an undesired pattern of e-mail messages is the first step in reducing or eliminating the volume of undesired e-mail messages received by a computer system or server. Once detection is accomplished, a policy can be set on the computer system or server to filter out the sources or types of e-mail messages.

Traditional methods for reducing or eliminating the volume of undesired e-mail messages focus on filtering techniques once sources or types of undesired e-mail have been identified. These methods assume that sources or types of undesired e-mail are given, and/or identify sources or types on a per-e-mail basis. For example, one per-e-mail basis determination technique involves analyzing the header of a particular e-mail to determine whether that e-mail was sent in a way that hides its true origin. A filter may then be used in conjunction with this technique to disregard any e-mail message hiding its true origin.

Format of Internet E-mail Messages

The 821 Header

The 821 header is a header which is attached to e-mail messages and which contains routing information for the e-mail. The 821 header contains commands and replies sent before transmission of the e-mail message at the Simple Mail Transfer Protocol ("SMTP") level.

SMTP is based on a model of communication in which, as a result of a user e-mail request, a sender-SMTP establishes a two-way transmission channel with a receiver-SMTP. The receiver-SMTP may be the ultimate destination, or just an intermediary. In the transmission channel, SMTP commands are generated by the sender-SMTP and sent to the receiver-SMTP. The receiver-SMTP sends SMTP replies to the sender-SMTP in response to these commands.

In a typical exchange between the sender-SMTP and the receiver-SMTP, the sender-SMTP will send a "MAIL FROM" command indicating the sender of the e-mail. The receiver-SMTP will respond with an "OK" reply, if it can accept the e-mail. The sender-SMTP will then send a "RCPT" command, which identifies the recipient of the e-mail. If the receiver-SMTP can accept the e-mail message for that recipient, it will respond with an "OK" reply; if not, it will respond with a reply rejecting that recipient. Other recipients may then be negotiated. After all recipients have been negotiated, the sender-SMTP will send the data constituting the e-mail message. If the receiver-SMTP successfully receives the e-mail data, it will respond with an "OK" reply.

The command and reply sequence in the transmission channel will be part of an e-mail which is successfully transmitted, forming the 821 header for that e-mail message. This header will be comprised of fields of text, where each field represents a command or reply in the sequence. Additional details on SMTP commands and format can be found in the Internet standard document "Requests for Comments #821, Simple Mail Transfer Protocol," Jonathan B. Postel (1982).

The 822 Header

Text messages sent by e-mail may be viewed as having an envelope and contents. The contents of an e-mail text message comprise the data sought to be conveyed to the recipient. The envelope contains information needed to accomplish transmission and delivery of the contents. This envelope is comprised of a header and fields within the header, where each field contains two sub-fields, a field-name and a field-body. The field-name specifies the name of the field, whereas the field-body contains the content of that field for that e-mail message.

The header which is a part of the e-mail message ("the 822 header") is different from and in addition to the 821 header discussed earlier. The 821 header is used for mail routing, whereas the 822 header contains envelope information for an e-mail subscriber.

Typical 822 header fields include a "to" field containing the e-mail address of the receiving subscriber, "cc" and "bcc" fields containing addresses of subscribers to which copies of the e-mail message are sent, a "subject" field which may include a sending-subscriber text string identifying the subject of the e-mail message, and other fields. Formatting, and additional details of the 822 header are discussed in the Internet standard document "Request for Comments #822, Standard for the Format of ARPA Internet Messages," David H. Crocker (1982).

EXAMPLES OF UNDESIRED E-MAIL USAGE

What constitutes undesired e-mail usage may vary depending on the e-mail policies implemented on a specific computer system or server. One general characteristic is that a large number of unwanted e-mail messages which tax system resources is usually produced as a consequence of such undesired usage. Undesired e-mail is not always generated by a malicious user; such e-mail may be generated unintentionally by users or even systems. For purposes of illustration, the following examples will assume that the environment comprises a wireless telephonic service provider, a gateway operated by the wireless telephonic service provider (the mobile device gateway), remote gateways not part of the wireless telephonic service provider and subscribers with mobile devices capable of communicating with the gateways operated by the wireless telephonic service provider through the remote gateways. In the following examples, the point of view of the wireless telephonic service provider is taken in considering what constitutes undesired e-mail usage.

Example 1

A subscriber put in place an automatic notification system which sent e-mail to his/her mobile device when his/her system was unreachable by his/her monitoring system. The system had a failure which caused this monitoring check to trigger and send e-mail messages stating that the system was unreachable. Unfortunately, this caused thousands of e-mail messages to be sent in a short amount of time to the mobile device gateway. These e-mail messages contained the same information. Such e-mail usage is undesirable.

Example 2

Similar to example 1, except that the monitoring trigger was based on the status of a database instead of whether the system was reachable.

Example 3

A system administrator frequently mailed information on the health of the system to a number of mobile users, regardless of the condition of the system. The average e-mail message load was approximately 600 messages per hour. Such e-mail usage is undesirable.

Example 4

A paging service was unable to use the blind copy feature to copy several recipients on an e-mail message. Therefore, the service sent the same e-mail message to these recipients, one at a time. Such e-mail usage could be deemed undesirable.

Example 5

An e-mail message may be relayed through a gateway although the e-mail message is not destined to or sourced from that gateway. Consequently, a system attached to the gateway may be used contrary to its designated purpose. Use of the system by such e-mail is undesirable.

Example 6

Mail bombing comprises sending continuous e-mail messages to a destination from one or several sources. It is an unacceptable attempt to disable an e-mail system or e-mail account. Such use of e-mail is undesirable.

Example 7

Some invaders of a system may attempt to pipe commands for execution through an e-mail server. For example, invaders have attempted to use e-mail servers to pipe unauthorized Telnet sessions out from the system for their use. Such use of e-mail is undesirable.

Example 8

An unsolicited e-mail message was sent to subscribers of a wireless system, using a number generator that incremented the user field. This caused a number of e-mail messages with the same content to be sent to subscribers. Such e-mail usage is undesirable.

Known Solutions

Most of the work in reducing or eliminating undesired e-mail has been performed in the area of filtering.

Origin-Based Heuristic Filtering

Heuristic filtering presumes that an undesired e-mail can be detected without the cooperation of the originator. In origin-based heuristic filtering, entire groups of originators of undesired e-mail, usually everyone from a particular Internet Service Provider ("ISP") or a particular domain, are distinguished from other users. Origin filtering prevents e-mail from such groups from being saved in the destination host's message store. This method relies on originators using the same or similar addresses each time they send undesired e-mail. Origin-based heuristic filtering can be implemented in various ways:

(i) One implementation of origin-based heuristic filtering may be performed at the Internet Protocol ("IP") layer. In this implementation, routers at the local site are instructed to not route IP packets from a list of addresses corresponding to known originators of undesired e-mail. This implementation assumes that the identities of originators are already known.

(ii) A second implementation of origin-based heuristic filtering may be performed at the Transmission Control Protocol ("TCP") layer. In this implementation, a Simple Mail Transfer Protocol ("SMTP") server is configured to look up the IP address or domain name of an originator as it connects to the SMTP server. If the originator is on a list of known, prohibited sites, the SMTP server can refuse to accept any SMTP commands. This implementation of filtering is performed immediately after the TCP connection is opened, before any SMTP commands are exchanged. This implementation assumes that the identities of originators are already known.

(iii) A third implementation of origin-based heuristic filtering may be performed at the SMTP layer. In this implementation, the receiving SMTP server can check the domain name of a sending SMTP server during execution of the SMTP "MAIL FROM" command. The receiving SMTP server can refuse to receive a message if the domain name is on a list of prohibited sites. This filtering is performed before any message text is transmitted. This implementation assumes that the identities of originators are already known.

(iv) A fourth implementation of origin-based heuristic filtering may be performed on an e-mail message by comparing the IP address specified in the SMTP "MAIL FROM" command with the IP address of the TCP connection. If the two IP addresses don't match, the SMTP server can refuse to receive the message. This implementation determines the identity of the originator of undesired e-mail on a per-e-mail basis.

Message-Based Heuristic Filtering

Message-based heuristic filtering attempts to identify undesired e-mail by analyzing segments of the received e-mail message such as special content, headers, addressing style, and sender address. This type of filtering may occur in the message store before the recipient has retrieved it, or in the recipient's mail client as the recipient retrieves the message. This implementation determines the identity of the originator of undesired e-mail on a per-e-mail basis.

Cooperative Filtering

This type of filtering depends on cooperation between originators and recipients of undesired e-mail. In content labeling-type cooperative filtering, messages may contain additional originator-supplied information, such as the type of information contained in the e-mail message. The recipient may then eliminate undesired e-mail by performing filtering on the originator-supplied information.

In recipient-registration type cooperative filtering, recipients of undesired e-mail can register with senders of such e-mail. The senders may then refrain from sending e-mail to registered recipients.

In both of these types of filtering, the sender of undesired e-mail identifies himself/herself as such; therefore, the identity of the originator of undesired e-mail is known beforehand.

Other Methods

Undesired e-mail may be reduced by enacting prohibitory regulatory laws. Contractual mechanisms may also be used to reduce undesired e-mail. Requiring fees for sending e-mail would also reduce undesired e-mail.

SUMMARY OF THE INVENTION

Embodiments of the invention identify undesired e-mail messages by receiving e-mail messages, storing fields including at least one field from the header of each received e-mail message and analyzing the stored fields for at least one pattern indicative of undesired e-mail messages.

In one embodiment, the stored fields are analyzed using pattern recognition that involves counting the number of e-mails received which have the same or similar field content within the headers. This number can be compared to an absolute threshold number, or to the total number of messages in a sample of e-mail messages. The sample may be composed of a predetermined number of received e-mail messages, or may include e-mail messages received during a predetermined time interval. Exceeding thresholds or certain ratios will trigger alarms to alert monitoring functions and update lists of known sources and types of undesired e-mail messages for filtering.

DETAILED DESCRIPTION

Embodiments of the invention identify undesired e-mail messages by storing fields from the headers of incoming e-mail messages and analyzing the stored fields for patterns indicative of undesired e-mail messages. By focusing on headers of e-mail messages, the embodiments avoid the computationally costly task of identification through analysis of the contents of the e-mail messages.

In one embodiment, the pattern recognition involves counting the number of e-mails received which have the same or similar field content within the headers. This number can be compared to an absolute threshold number, or to the total number of messages in a sample of e-mail messages. The sample may be composed of a predetermined number of received e-mail messages, or may include e-mail messages received during a predetermined time interval. Exceeding thresholds or certain ratios will trigger alarms to alert monitoring functions and update lists of known sources and types of undesired e-mail messages for filtering.

Sub-strings within a field may be stored and analyzed in lieu of the entire content of a field. In this document, "field" will also include such sub-strings of a field.

Figure 1:
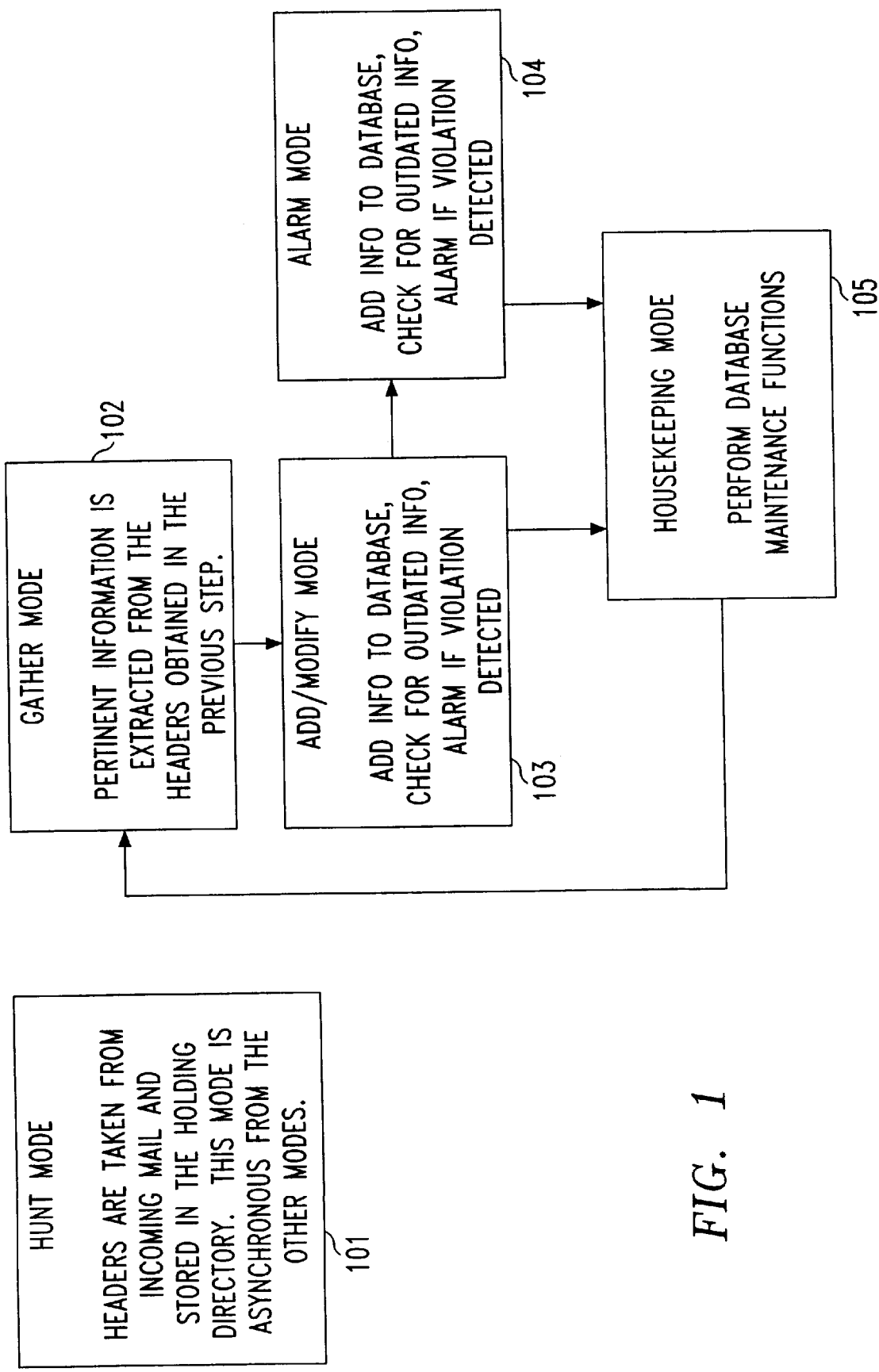
FIG. 1 illustrates a flowchart for a software implementation of an embodiment of the invention.

FIG. 1 shows a flowchart for one embodiment of the invention. The embodiment is a computer program designed to analyze all incoming e-mail messages and detect high frequency e-mail either originating from a single user or destined to a single user. However, the embodiment can be modified to detect other types of undesired e-mail based on the pattern signature of such e-mail messages. The embodiment protects the receiving e-mail system not only against malicious users, but also against such events as routing accidents. Such an accident might occur if a user were to inadvertently configure a routing mechanism that routes prodigious quantities of e-mail to a single recipient in a very short interval of time.

The embodiment comprises the five modes shown in FIG. 1. Hunt Mode 101 will extract fields from headers of incoming e-mail messages after they pass through a filter, SMTPvalidate. For example, fields from the 821 header and/or the 822 header may be extracted in the Hunt Mode. SMTPvalidate, among other tasks, performs filtering by checking whether a received e-mail message matches information maintained in a deny list. The Hunt Mode will place fields from headers of an e-mail message that does not match deny list information into a holding queue for further processing. The filtering performed by SMTPvalidate allows the taking of data for pattern analysis for e-mail messages that are not known to comprise undesired e-mail and the omission of messages which have previously been determined to be undesirable.

Gather Mode 102 takes fields from headers which are extracted from the Hunt Mode and stores them within a specific data structure. The information stored includes a "from" address field and "to" address fields from the headers of an e-mail message which is being processed. Other embodiments checking for other patterns may store additional or other fields from headers.

Information obtained in the Gather Mode is passed to Add/Modify Mode 103. All additions made to the internal statistical tables, which store the information used in determining undesired e-mail, take place through the Add/Modify interface. The internal statistical tables are lists that are comprised of records; each record corresponds to a tracked type of e-mail. For example, a record in a list maintained for detecting the pattern of many e-mail messages sent to a single recipient would contain information on the number of messages received by that specific recipient over a predetermined time interval.

When the Add/Modify Mode receives a field from a message header, it first determines whether the relevant list is already tracking e-mail messages with the same or similar fields. If such e-mail messages with the same or similar fields are already being tracked, the record corresponding to such e-mail messages is updated. In particular, the counter within the record counting such e-mail messages is incremented. Whenever an update occurs, the Add/Modify Mode checks for violations of the thresholds set for e-mail messages with the same type of header fields. Violations of the thresholds signal the routine to trigger Alarm Mode 104. The Alarm Mode in turn generates a signal that is capable of alerting operations personnel. The Alarm Mode can also be adapted to add sources or types of e-mail which trigger the Alarm Mode to the deny list used by SMTPvalidate for the initial screening.

Because the embodiment determines undesired e-mail usage through statistical means (i.e., pattern analysis of a plurality of headers), statistical samples are collected during predetermined time intervals. Therefore a record should be maintained for only such a predetermined time interval. The Add/Modify Mode deletes a record when it detects that the record has expired. However, deleting records is only an optimization of Add/Modify Mode, and not a primary function. Housekeeping Mode 105 has primary responsibility for deleting expired records by traversing through the internal database.

Figure 2:
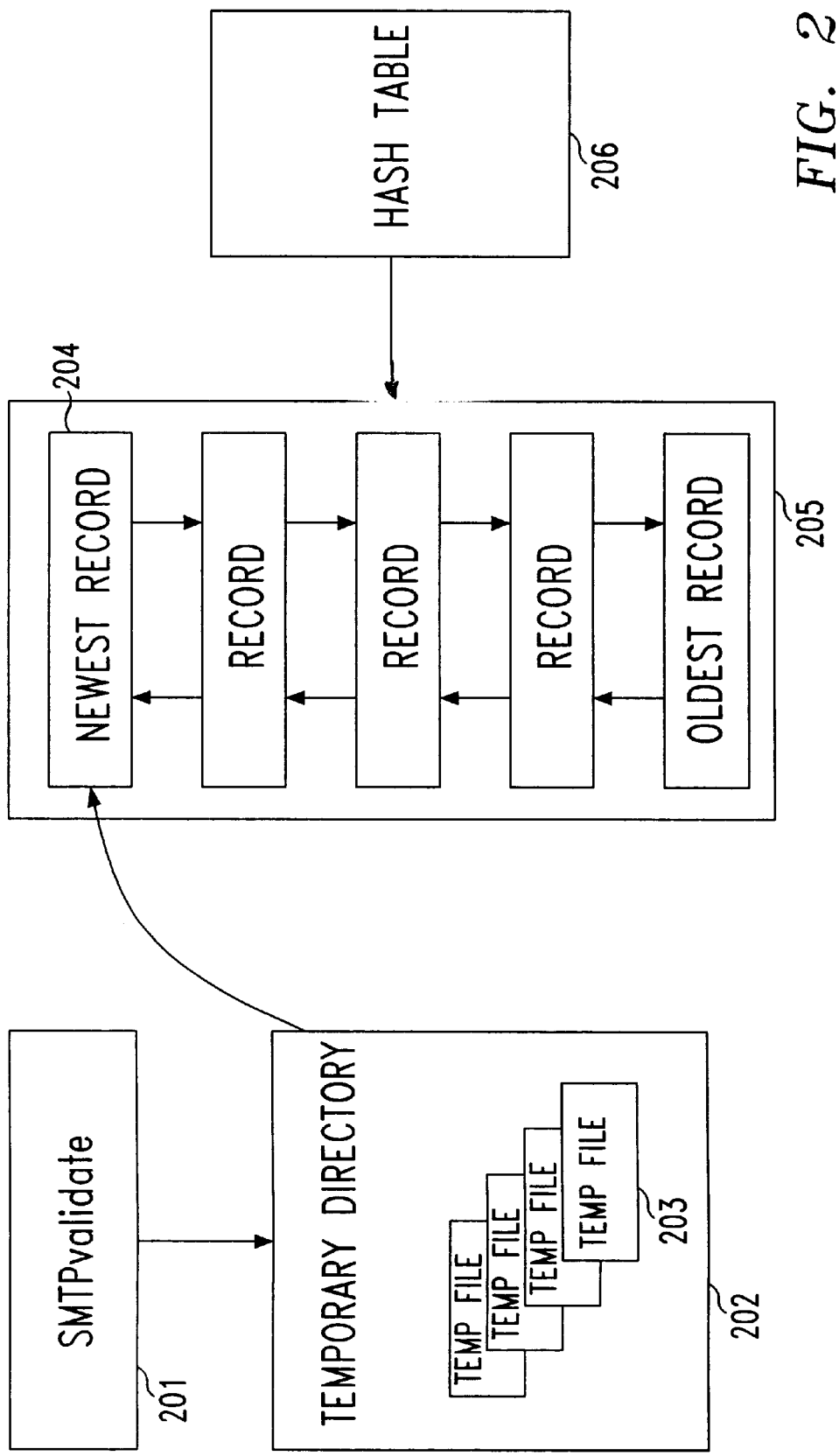
FIG. 2 illustrates the data path in a software implementation of an embodiment of the invention.

FIG. 2 shows the data path through the embodiment. Fields from headers of received e-mail messages which are not filtered out by SMTPvalidate 201 are stored as temporary files 203 in the temporary directory 202. The Gather Mode takes a field stored within a temporary file 203 and either creates a new record 204 within list 205 or updates an existing record within list 205. Records within list 205 are accessed by the Add/Modify Mode by means of hash table 206.

Figure 3:
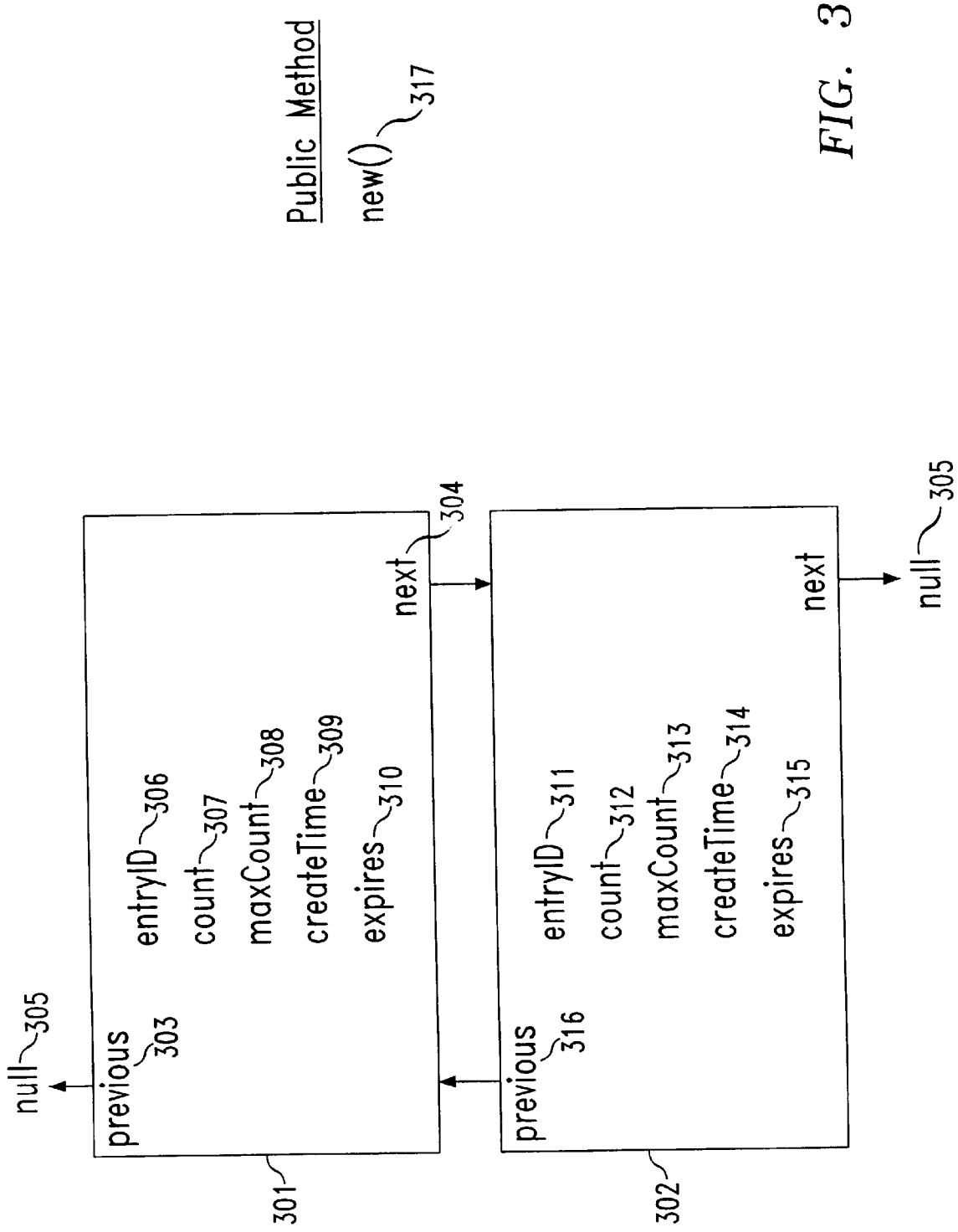
FIG. 3 illustrates the structure of records in a software implementation of an embodiment of the invention.

FIG. 3 shows the structure of record objects (or records). In particular, FIG. 3 shows two record objects, record object 301 and 302, linked together in a double-linked list. Record object 301 has pointer 303 and pointer 304 which point to the previous record and next record, respectively, which for this case is the null record 305 and record 302, respectively. Record object 301 contains record identifier 306 (entryID). For example, for a list maintained for purposes of identifying undesired use in the form of many originators sending e-mail messages to a single recipient, the record identifier for records in that list will contain the recipient's e-mail address (or a sub-string thereof) as stored in the "to" field of the e-mail header.

The variable count 307 counts the number of e-mail messages with record identifier 306 received during the predetermined time interval. The variable maxCount 308 contains the threshold value for record 301. When variable count 307 becomes greater than variable maxCount 308, Add/Modify Mode signals that a violation has occurred.

The variable createTime 309 holds the time stamp of the file which originally created record 301. The variable expires 310 contains the time stamp for when record 301 is set to expire.

Items 316 and 311–315 identify structures of record 302 analogous to structures 303 and 306–310, respectively, of record 301.

Method new( ) 317 is a public method (routine) that creates a new record and sets up the data structures discussed above.

Figure 4:
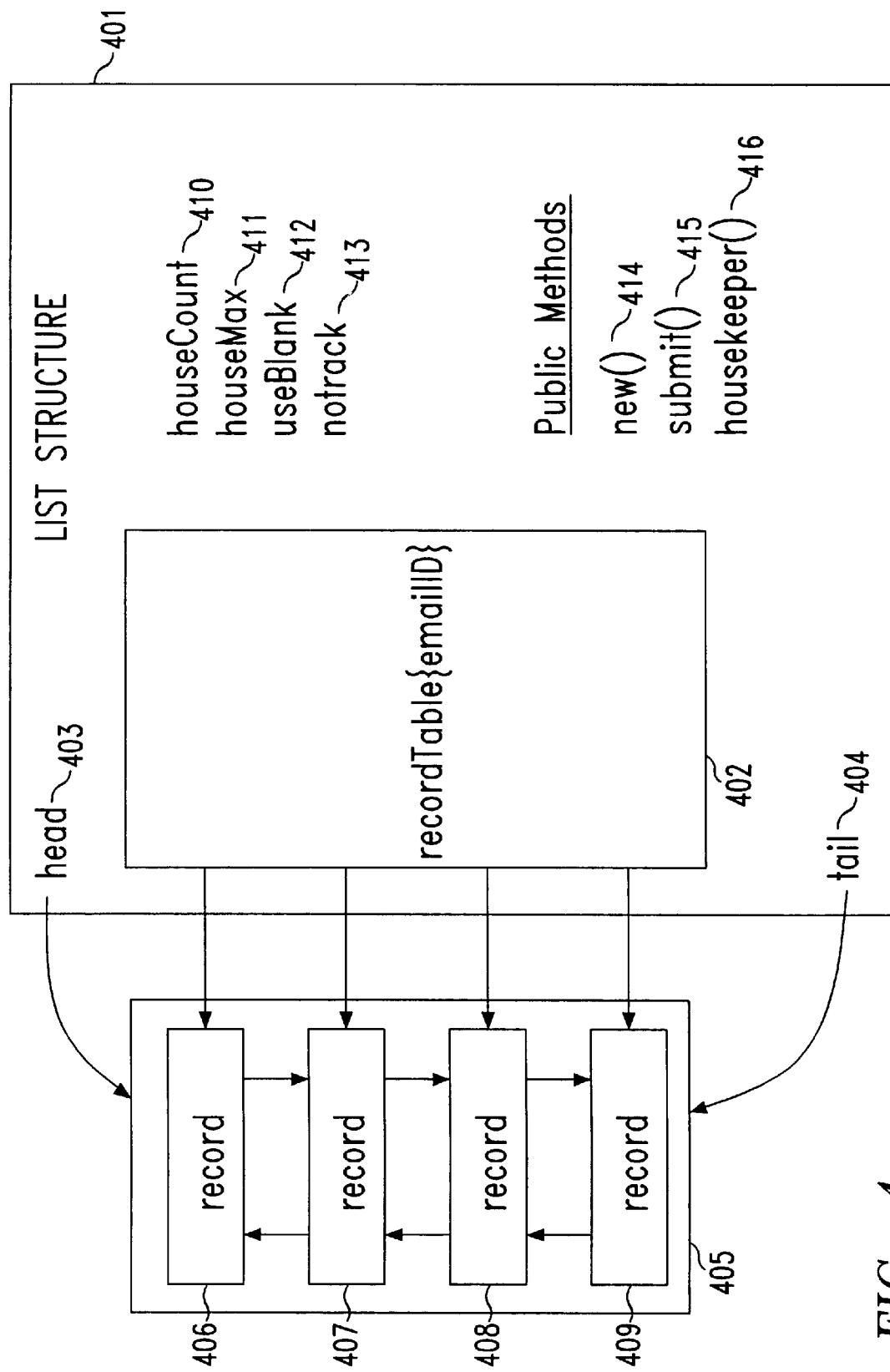
FIG. 4 illustrates the structure of a list in a software implementation of an embodiment of the invention.

FIG. 4 shows the structure of list 401. List 401 contains a hash function 402 which takes a record identifier as input and returns a pointer to the record, contained in the double-linked list of records 405, with that record identifier. Pointers 403 and 404 are pointers to the top record and bottom record, respectively, of the double-linked list of records 405. In this illustration, the double-linked list of records 405 is comprised of records 406, 407, 408 and 409.

Variable houseCount 410 keeps a running count of the number of messages processed since the last housekeeping function. Variable houseMax 411 stores the maximum number of messages which should be processed before initiating a housekeeping check.

Variable useBlank 412 is an internal variable which allows turning on and off the ability to track blank addresses. Variable noTrack 413 is an internal variable used to make notes of which addresses have been placed in an exceptions file, which contains the addresses for which processing is bypassed.

Method new( ) 414 is a public method that creates a new list and sets up the data structures discussed above. Method submit( ) 415 is a routine that submits fields from headers to the list for creation of new records or the updating of old records, and checks for violations of the thresholds. Method housekeeper( ) 416, which implements the Housekeeping Mode, is a routine that periodically cleans the list by checking for and deleting expired records.

Figure 5:
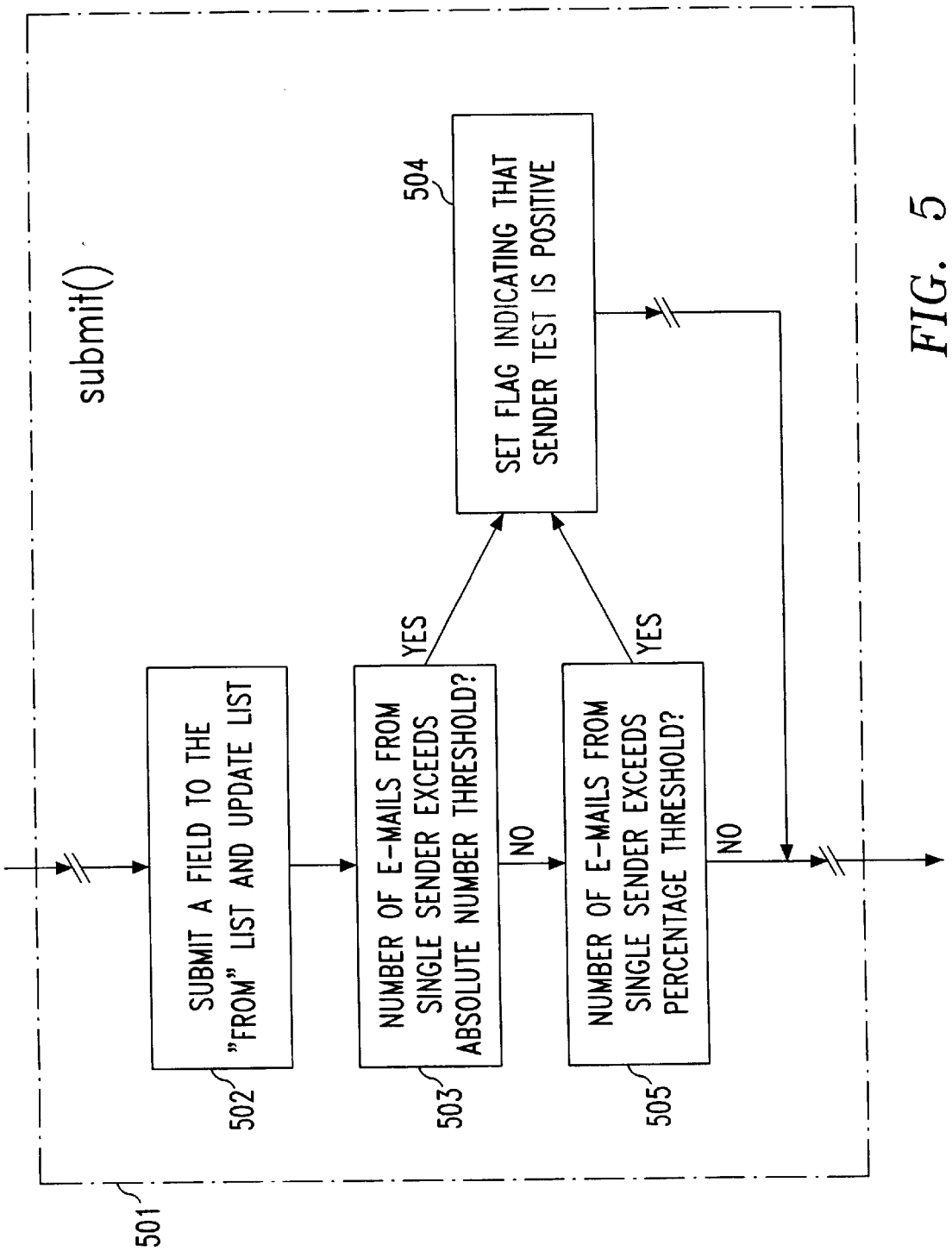
FIG. 5 illustrates a segment of the pattern-analysis logic in a software implementation of an embodiment of the invention.

FIG. 5 shows part of the logic contained within method submit( ) 501. The logic shown in FIG. 5 checks for whether the number of e-mail messages from a single originator has exceeded predetermined thresholds. At step 502, a field is submitted for entry into the list that tracks originators of e-mail messages. This field contains information identifying the originator of a received e-mail message. The submitted field either increments the counter for an existing, corresponding record or causes the creation of a new corresponding record within the list. At decisional step 503, the logic checks whether the number of e-mail messages from the originator exceeds the absolute number threshold for the corresponding record. (One way of accomplishing this is to compare the value of the variable count for the corresponding record with the value of maxCount for that record.) If the absolute threshold number has been exceeded, a flag is set at step 504 indicating that the number of e-mail messages from the originator has exceeded a threshold. If the absolute threshold number has not been exceeded, control flows to step 505, which checks whether the percentage of e-mail messages from the originator in a certain sample of e-mail messages exceeds a percentage threshold for the corresponding record. (One way of accomplishing this is to compare the ratio of variable count and the variable houseCount to a predetermined ratio threshold.) For example, the sample may be defined to include all e-mail messages that are being tracked by unexpired records within the list over a certain period of time. Another example of a sample would be a group of N received e-mail messages being tracked by unexpired records within the list, where N is a predetermined integer. If the percentage threshold has been exceeded, a flag is set at step 504 indicating that the number of e-mail messages from the originator has exceeded a threshold. If the percentage threshold has not been exceeded, control flows on without the setting of the flag.

Figure 6:
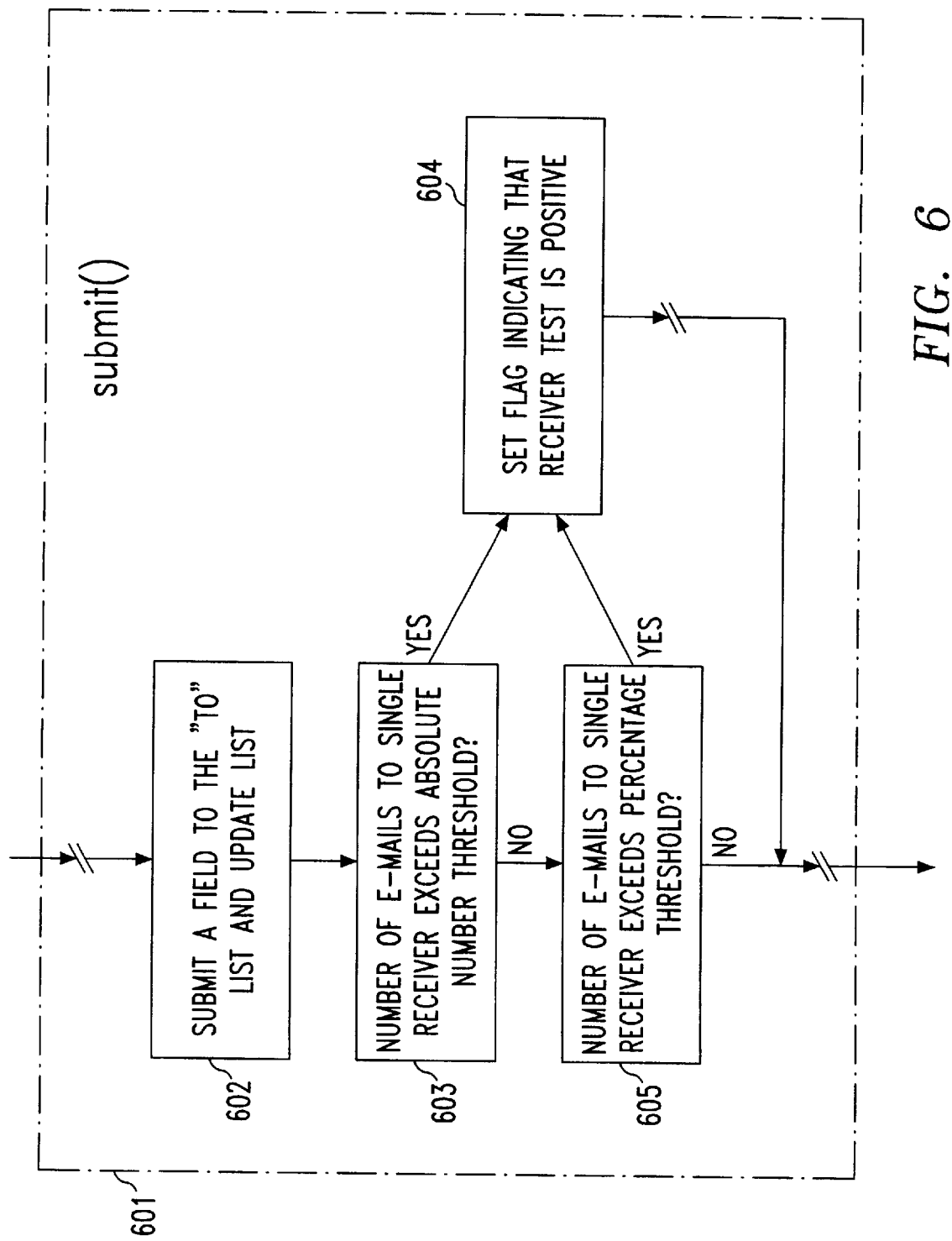
FIG. 6 illustrates a segment of the pattern-analysis logic in a software implementation of an embodiment of the invention.

FIG. 6 shows part of the logic contained within method submit( ) 601 for this embodiment. The logic shown in FIG. 6 checks for whether the number of e-mail messages to a single recipient has exceeded predetermined thresholds. At step 602, a field is submitted for entry into the list that tracks recipients of e-mail messages. This field contains information identifying the recipient of a received e-mail message. The submitted field either increments the counter for an existing, corresponding record or causes the creation of a new corresponding record within the list. At decisional step 603, the logic checks whether the number of e-mail messages to the recipient exceeds the absolute number threshold for the corresponding record. (One way of accomplishing this would be to compare the value of the variable count for the corresponding record with the value of maxCount for that record.) If the absolute threshold number has been exceeded, a flag is set at step 604 indicating that the number of e-mail messages to the recipient has exceeded a threshold. If the absolute threshold number has not been exceeded, control flows to step 605, which checks whether the percentage of e-mail messages to the recipient in a certain sample of e-mail messages exceeds a percentage threshold for the corresponding record. (One way of accomplishing this is to compare the ratio of variable count and variable houseCount to a predetermined ratio threshold.) For example, the sample may be defined to include all e-mail messages that are being tracked by unexpired records within the list over a certain period of time. Another example of a sample would be a group of N received e-mail messages being tracked by unexpired records within the list, where N is a predetermined integer. If the percentage threshold has been exceeded, a flag is set at step 604 indicating that the number of e-mail messages to the recipient has exceeded a threshold. If the percentage threshold has not been exceeded, control flows on without the setting of the flag.

Figure 7:
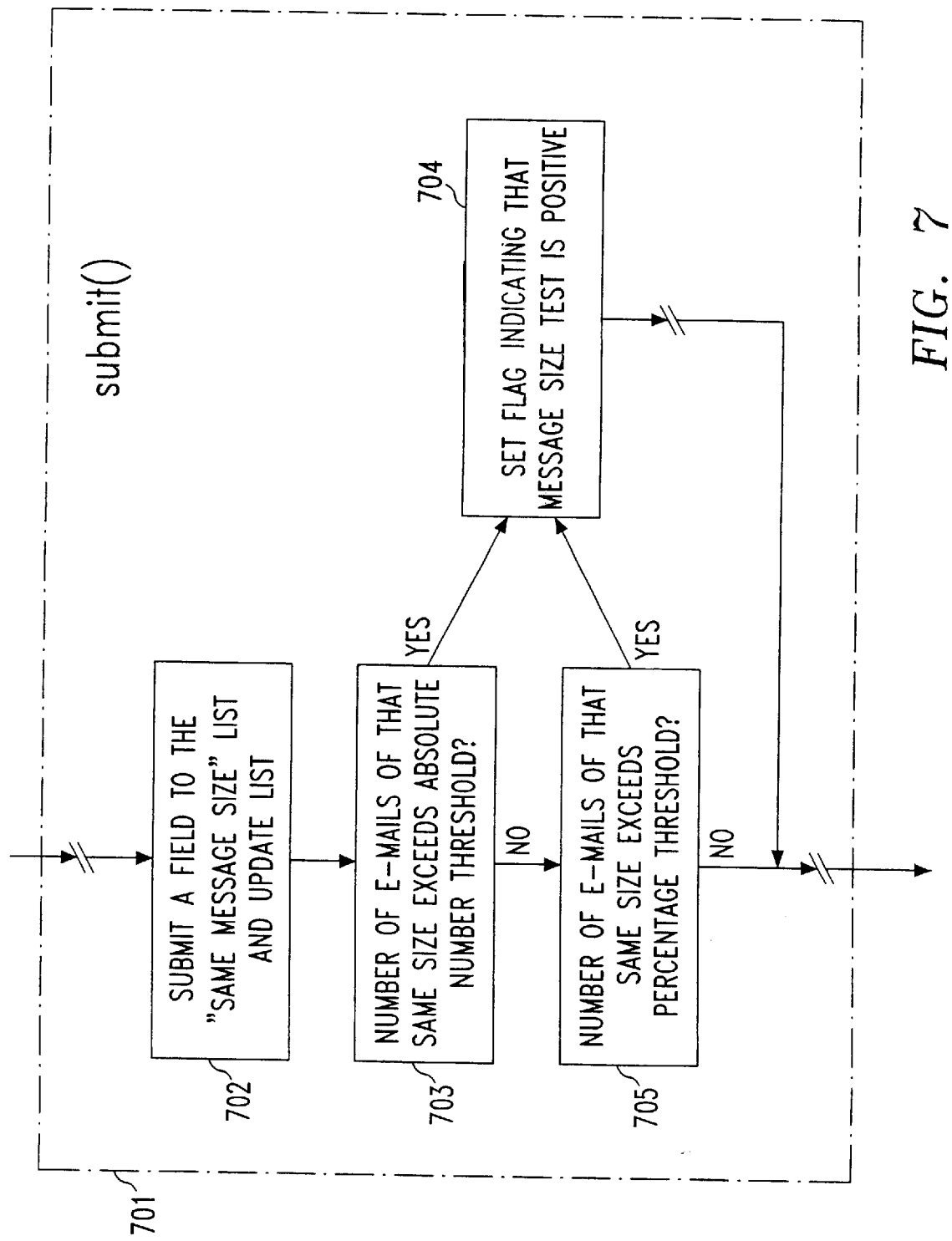
FIG. 7 illustrates a segment of the pattern-analysis logic in a software implementation of an embodiment of the invention.

Different embodiments may add additional functionality to submit( ). FIG. 7 shows an example of such added functionality. The logic shown in FIG. 7 checks for whether the number of e-mail messages of the same size has exceeded predetermined thresholds. At step 702, a field is submitted for entry into the list that tracks e-mail messages of the same size. This field contains information identifying the size of a received e-mail message. The submitted field either increments the counter for an existing, corresponding record, or causes the creation of a new corresponding record within the list. At decisional step 703, the logic checks whether the number of e-mail messages of that same size exceeds the absolute number threshold for the corresponding record. (One way of accomplishing this would be to compare the value of the variable count for the corresponding record with the value of maxCount for that record.) If the absolute threshold number has been exceeded, a flag is set at step 704 indicating that the number of e-mail messages of that same size has exceeded a threshold. If the absolute threshold number has not been exceeded, control flows to step 705, which checks whether the percentage of e-mail messages of that same size in a certain sample of e-mail messages exceeds a percentage threshold for the corresponding record. (One way of accomplishing this is to compare the ratio of variable count and the variable houseCount to a predetermined ratio threshold.) For example, the sample may be defined to include all e-mail messages that are being tracked by unexpired records within the list over a certain period of time. Another example of a sample would be a group of N received e-mail messages being tracked by unexpired records within the list, where N is a predetermined integer. If the percentage threshold has been exceeded, a flag is set at step 704 indicating that the number of e-mail messages of the same size has exceeded a threshold. If the percentage threshold has not been exceeded, control flows on without the setting of the flag.

Figure 8:
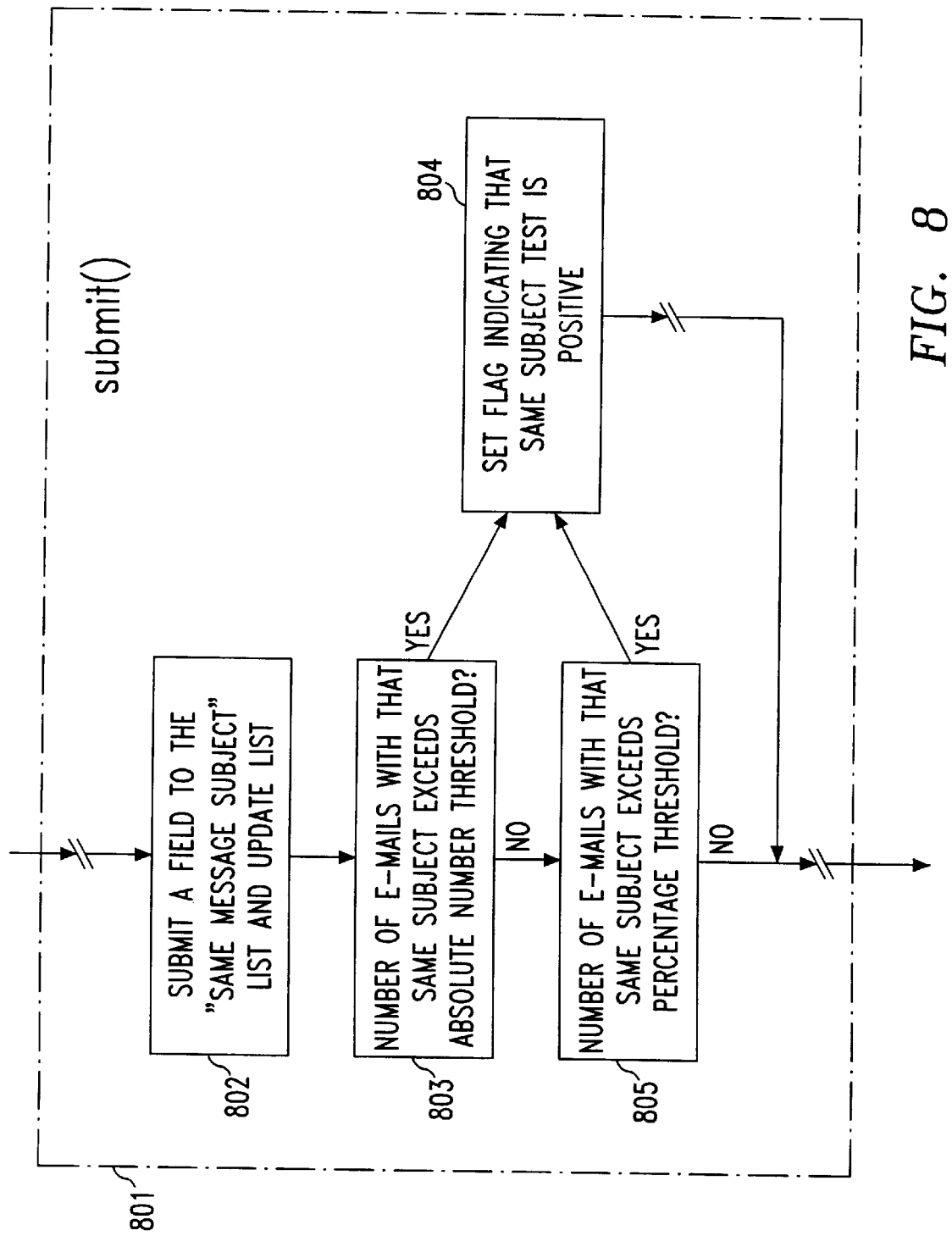
FIG. 8 illustrates a segment of the pattern-analysis logic in a software implementation of an embodiment of the invention.

Another example of added functionality that can be added to method submit( ) is shown in FIG. 8. The logic shown in FIG. 8 checks for whether the number of e-mail messages with the same subject field has exceeded predetermined thresholds. At step 802, a subject field is submitted for entry into the list that tracks e-mail messages with the same subject. The submitted field either increments the counter for an existing, corresponding record, or causes the creation of a new corresponding record within the list. At decisional step 803, the logic checks whether the number of e-mail messages with that same subject field exceeds the absolute number threshold for the corresponding record. (One way of accomplishing this would be to compare the value of the variable count for the corresponding record with the value of maxCount for that record.) If the absolute threshold number has been exceeded, a flag is set at step 804 indicating that the number of e-mail messages with that same subject field has exceeded a threshold. If the absolute threshold number has not been exceeded, control flows to step 805, which checks whether the percentage of e-mail messages with that same subject field in a certain sample of e-mail messages exceeds a percentage threshold for the corresponding record. (One way of accomplishing this is to compare the ratio of variable count and the variable houseCount to a predetermined ratio threshold.) For example, the sample may be defined to include all e-mail messages that are being tracked by unexpired records within the list over a certain period of time. Another example of a sample would be a group of N received e-mail messages being tracked by unexpired records within the list, where N is a predetermined integer. If the percentage threshold has been exceeded, a flag is set at step 804 indicating that the number of e-mail messages with the same subject field has exceeded a threshold. If the percentage threshold has not been exceeded, control flows on without the setting of the flag.

Figure 9:
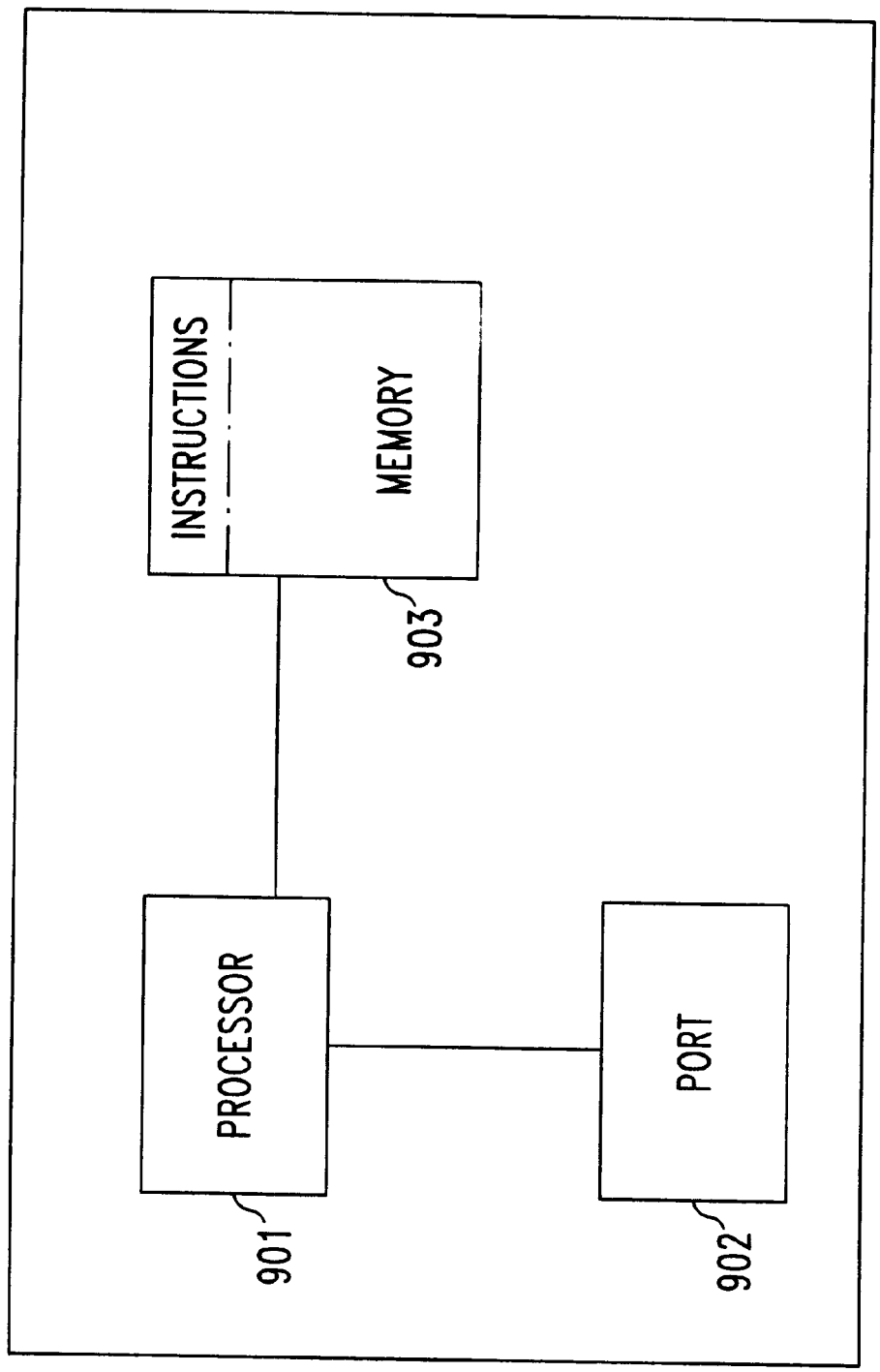
FIG. 9 illustrates an apparatus embodiment of the invention.

FIG. 9 is a block diagram of an apparatus according to an embodiment of the present invention. In this embodiment, processor 901 is coupled to port 902. Port 902 can receive a query and send a response to a query. Memory 903 is coupled to said processor 901. Memory 903 stores the instructions adapted to run on said processor to perform any method embodiment of the present invention. For example, memory 903 can store instructions adapted to be run on processor 901 to identify undesired e-mail messages by storing fields within the headers of incoming e-mail messages and analyzing the stored fields for patterns indicative of undesired e-mail messages.

As disclosed above, embodiments of the present invention analyze fields from the headers of received e-mail messages in order to identify patterns of undesired e-mail usage. An embodiment of the invention was presented in which the contents of a given field from the header of a plurality of received e-mail messages were stored, the number of stored fields with identical or similar content was counted, and a source or type of e-mail message was identified as undesired when the number of stored fields with identical or similar content exceeded a predetermined threshold. This embodiment is an example of finding and counting the correlations of fields from the headers of a plurality of e-mail messages, where the correlation searched for is a field with identical or similar content across a plurality of received e-mail messages. Those skilled in the art will recognize that other embodiments of the present invention may include searches for other types of correlations of fields across a plurality of received e-mail messages. For example, the contents of more than one field (e.g. the "subject" field and the "cc" field) of each e-mail message from a plurality can be searched for particular strings or patterns of content. Thus, irrespective of whether the fields are identical or nearly identical, if a correlation between header fields of a plurality of messages can be ascertained, that correlation can be useful in identifying an undesirable class of messages.

What is claimed is:

1. A method for detecting undesired e-mail usage, the method comprising:

receiving a plurality of e-mail messages;

storing a plurality of fields, the fields including at least one field from the header of each e-mail message from a subset of the plurality of e-mail messages; and analyzing the stored plurality of fields for at least one pattern, the at least one pattern indicating undesired e-mail usage, wherein said analyzing includes counting the number of fields in a subset of the stored plurality of fields, each field in the subset either being correlated with any other field in the subset, containing an identical entry, or containing at least one identical string.

2. A method for detecting undesired e-mail usage, the method comprising:

receiving, during a predetermined time interval, a plurality of e-mail messages;

storing a plurality of fields, the fields including at least one field from the header of each e-mail message from a subset of the plurality of e-mail messages; and analyzing the stored plurality of fields for at least one pattern, the at least one pattern indicating undesired undesired e-mail usage, wherein said analyzing includes counting the number of fields in a subset of the stored plurality of fields, each field in the subset either being correlated with any other field in the subset, containing an identical entry, or containing at least one identical string.

3. A method for detecting undesired e-mail usage, the method comprising:

receiving a plurality of e-mail messages;

storing a plurality of fields, the fields including at least one field from the header of each e-mail message from a predetermined number of e-mail messages from the plurality of e-mail messages; and analyzing the stored plurality of fields for at least one pattern, the at least one pattern indicating undesired e-mail usage, wherein said analyzing includes counting the number of fields in a subset of the stored plurality of fields, each field in the subset either being correlated with any other field in the subset, containing an identical entry, or containing at least one identical string.

4. A method for detecting undesired e-mail usage, the method comprising:

receiving a plurality of e-mail messages;

storing a plurality of fields, the fields including, for each e-mail message from a subset of the plurality of e-mail messages, at least one field from either the 821 header or the 822 header of that e-mail message; and analyzing the stored plurality of fields for at least one pattern, the at least one pattern indicating undesired e-mail usage, wherein said analyzing includes counting the number of fields in a subset of the stored plurality of fields, each field in the subset either being correlated with any other field in the subset, containing an identical entry, or containing at least one identical string.

5. An apparatus for detecting undesired e-mail usage, the apparatus comprising:

(a) a processor;

(b) a memory, coupled to said processor, said memory storing instructions adapted to be executed by said processor, the instructions including:

receiving a plurality of e-mail messages;

storing a plurality of fields, the fields including at least one field from the header of each e-mail message from a subset of the plurality of e-mail messages; and analyzing the stored plurality of fields for at least one pattern, the at least one pattern indicating undesired e-mail usage, wherein the analyzing instruction in said memory includes counting the number of fields in a subset of the stored plurality of fields, each field in the subset either being correlated with any other field in the subset, containing an identical entry, or containing at least one identical string.

6. An apparatus for detecting undesired e-mail usage, the apparatus comprising:

(a) a processor;

(b) a memory, coupled to said processor, said memory storing instructions adapted to be executed by said processor, the instructions including:

receiving, during a predetermined time interval, a plurality of e-mail messages;

storing a plurality of fields, the fields including at least one field from the header of each e-mail message from a subset of the plurality of e-mail messages; and analyzing the stored plurality of fields for at least one pattern, the at least one pattern indicating undesired e-mail usage, wherein the analyzing instruction in said memory includes counting the number of fields in a subset of the stored plurality of fields, each field in the subset either being correlated with any other field in the subset, containing an identical entry, or containing at least one identical string.

7. An apparatus for detecting undesired e-mail usage, the apparatus comprising:

(a) a processor;

(b) a memory, coupled to said processor, said memory storing instructions adapted to be executed by said processor, the instructions including:

receiving a plurality of e-mail messages;

storing a plurality of fields, the fields including at least one field from the header of each e-mail message from a predetermined number of e-mail messages from the plurality of e-mail messages; and analyzing the stored plurality of fields for at least one pattern, the at least one pattern indicating undesired e-mail usage, wherein the analyzing instruction in said memory includes counting the number of fields in a subset of the stored plurality of fields, each field in the subset either being correlated with any other field in the subset, containing an identical entry, or containing at least one identical string.

8. An apparatus for detecting undesired e-mail usage, the apparatus comprising:

(a) a processor;

(b) a memory, coupled to said processor, said memory storing instructions adapted to be executed by said processor, the instructions including:

receiving a plurality of e-mail messages;

storing a plurality of fields, the fields including, for each e-mail message from a subset of the plurality of e-mail messages at least one field from either the 821 header or the 822 header of that e-mail message; and analyzing the stored plurality of fields for at least one pattern, the at least one pattern indicating undesired e-mail usage, wherein the analyzing instruction in said memory includes counting the number of fields in a subset of the stored plurality of fields, each field in the subset either being correlated with any other field in the subset, containing an identical entry, or containing at least one identical string.

* * * * *